United States Patent [19]

Brackmann et al.

[11] Patent Number: 4,972,853

[45] Date of Patent: Nov. 27, 1990

[54] CIGARETTE FILTER ROD ELEMENTS AND CIGARETTES INCORPORATING SUCH FILTER ROD ELEMENTS

[75] Inventors: Warren A. Brackmann, Mississauga, Canada; Tow P. Liew, Westcliff-on-Sea, England

[73] Assignee: SK Hand Tool Corporation, Defiance, Ohio

[21] Appl. No.: 420,426

[22] Filed: Oct. 12, 1989

[30] Foreign Application Priority Data

Oct. 12, 1988 [GB] United Kingdom ............... 8823902

[51] Int. Cl.$^5$ ............................................. A24D 3/04
[52] U.S. Cl. ...................................... 131/339; 131/340
[58] Field of Search ............... 131/331, 332, 336, 339, 131/340

[56] References Cited

U.S. PATENT DOCUMENTS

| 3,046,994 | 7/1962 | Schuv | 131/336 |
| 3,621,851 | 11/1971 | Heskett et al. | |
| 3,685,523 | 8/1972 | Labbe | |
| 3,854,384 | 12/1974 | Naylor | |
| 4,809,717 | 3/1989 | Imbery | |
| 4,869,275 | 9/1989 | Berger | 131/332 |
| 4,896,682 | 1/1990 | Liew | 131/339 |

FOREIGN PATENT DOCUMENTS

| 0254004 | 7/1985 | European Pat. Off. |
| 455609 | 5/1965 | Switzerland |
| 1097748 | 5/1986 | United Kingdom |

Primary Examiner—V. Millin
Attorney, Agent, or Firm—Allen D. Gutchess, Jr.

[57] ABSTRACT

A cigarette filter rod element including an axially extending barrier tube of micro-fine fibres with a diameter of between 0.5 and 10 microns and located so that at least part of the gas flow passes through the wall of said barrier tube.

17 Claims, 2 Drawing Sheets

CIGARETTE FILTER ROD ELEMENTS AND CIGARETTES INCORPORATING SUCH FILTER ROD ELEMENTS

BACKGROUND OF THE INVENTION

This invention relates to cigarette filter rod elements and cigarettes incorporating such filter rod elements.

It is well known that when either a smoker or a smoking machine smokes a conventional filter-tipped cigarette, the amount of 'tar' in each puff increases in each successive puff. The 'tar' yield of the last few puffs is usually several times higher than that from the first few puffs. Consequently the 'tar' in the last few puffs may be perceived by a smoker as 'too strong', and a smokier may therefore consider a cigarette as 'smoother' if the 'tar' delivery profile can be made more even.

There have been many attempts in the past to achieve an 'even' puff cigarette by modifying the filter. Mullor, U.S. Pat. No. 2,763,267 and Clayton et al, U.S. Pat. No. 3,809,097 proposed to use a plurality of discs to be placed inside a cigarette filter rod and placed transverse to the smoke flow. These designs, however, can only improve filtration efficiency, without any ability of evening the cigarette 'tar' profile.

Patterson, U.S. Pat. No. 3,648,712 proposed to use a low gas permeability disc placed transversely inside an ordinary cellulose acetate filter rod. The disc is of a diameter which is 5 to 25 percent less than the diameter of the filter rod and this filter can therefore only achieve improved filtration efficiency, with no ability to even the 'tar' delivery profile.

B.A.T. GB Patent No. 1,339,238 proposed placing a disc of a blocking plug between a tobacco rod and an ordinary cellulose acetate filter rod. This disc has an orifice for smoke to flow through. The disadvantage of this design is that the pressure drop of the cigarette will increase to an unacceptable level as the orifice of the plug becomes clogged up at the later puffs.

Brackmann et al., U.S. Pat. No. 3,882,877 proposed placing a disc of micro-fine fibres in between two filter rod segments. This filter is designed to increase filtration efficiency. However, it does not cause the 'tar' delivery to be more even, furthermore the pressure drop may increase to an unacceptable level at the later puffs.

Browne et al., U.S. Pat. Nos. 4,460,000 and 4,469,112 proposed using a compound filter that contains a perforated barrier disc through which the whole smoke passes to a cellulose acetate filter rod segment. As the smoking process proceeds, more and more 'tar' builds up on the cellulose acetate fibres around the exit of the perforations. The disadvantage of this design is that the build-up of 'tar' near the perforations will greatly increase the flow resistance of the cigarette filter to an unacceptable level.

G.B. Patent No. 2 102 271 A, G.B. Patent No. 2 103 065 A and G.B. Patent No. 2 105 566 A of Filtona (U.K.), proposed to employ two flow paths, i.e. the low pressure drop path which has low filtration efficiency and the high pressure drop path which has high filtration efficiency, for the smoke to flow in a filter rod. During the initial few puffs of a cigarette, the smoke tends to flow through the low pressure drop path. The smoke then switches to flow through the high pressure drop path due to the presence of a blocking mechanism on the low pressure drop path. The disadvantage of these filters is that they are very complicated and difficult to manufacture.

SUMMARY OF THE INVENTION

It is the objective of the present invention to provide a cigarette with a more even puff-by-puff 'tar' delivery profile and with an acceptable pressure drop by the use of a special cigarette filter.

The term "filter rod element" will be used herein to define an element which may form part of a filter rod for attachment to a cigarette, or which may itself provide the whole filter rod.

According to the present invention therefore, a cigarette filter rod element includes an axially extending barrier tube of micro-fine fibres with a diameter of between 0.5 and 10 microns and located so that at least part of the gas flow passes through the wall of said barrier tube. Preferably the barrier tube is made of micro-fine fibres having a packing density of 0.05 to 0.3 and the wall thickness is between 0.05 and 2 mm.

The barrier tube can be located axially within an outer tube which provides a flow path from end to end thereof and which is provided by a plug wrap or a separate member.

According to one preferred embodiment the barrier tube can be provided with one or more flow openings in the range of 0.1 mm to 3.0 mm in diameter with a combined total area of between 0.1 mm$^2$ and 10 mm$^2$.

The invention also includes a cigarette incorporating a filter rod element as set forth above.

The invention can be performed in many ways and some embodiments will now be described by way of example and with reference to the accompanying drawings in which:

DESCRIPTION OF THE PREFERRED EMBODIMENTS

Figure 1:
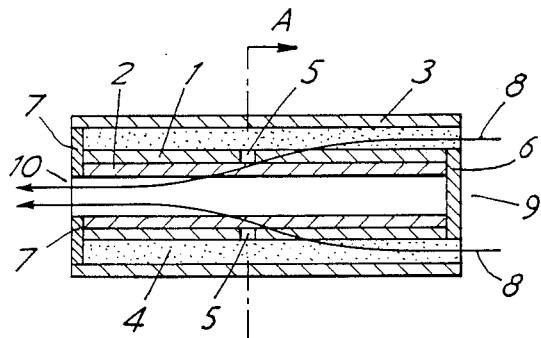
FIG. 1 is a cross-sectional view of one embodiment of a filter rod element according to the present invention.

As shown in FIG. 1 a cigarette filter or element according to the invention comprises a barrier tube 1 carried on a porous support in the form of a rigid and porous tube 2. The tube 2 may be a perforated tube made from a plastics material or a rigid tube made from a polymeric foam. An outer tube in the form of a plug wrap 3 is provided, the space between the barrier tube 1 and the plug wrap 3 being filled with a porous material 4 such as cellulose acetate tow or polypropylene tow, polymeric foam materials or any suitable granular materials. One or more apertures 5 situated at any convenient location are provided in the tube 1 and one end of the tube is blocked for gas flow as indicated by reference numeral 6. At the other end of the filter element the annular space between the plug wrap 3 and the tube 1 is blocked for gas flow by an annular disc as indicated by reference numeral 7. Arrows 8 indicate the direction of the smoke when it enters the filter rod element from end 9. The direction of flow of the smoke is of course reversed if it flows into the filter rod element from the other end 10.

The tube 1 is made from a layer of micro-fine fibers between 0.5 to 10 microns diameter or of a plurality of layers of fibres, at least one layer being of micro-fine fibres of 0.5 to 10 microns in diameter. The fibres have a packing density of 0.05 to 0.3 and the thickness of the layer is between 0.05 mm and 2 mm.

As such micro-fine filter material is difficult to handle it may be convenient to make the tube from a commerically available laminate fabric known as EHP (also known as EVOLUTION, KIMGUARD) made by Kimberly-Clark U.S.A. Other similar laminates which are equally suitable are SMS, BLUE DRAPE, LX43, LX293, LX274, LX275, LX276 all made by Kimberly-Clark. These laminates comprise three layers, one of which consists of meltblown micro-fine polypropylene fibres with a fibre diameter range from 1 micron to 8 microns, the majority being 1 to 3 microns. The other outer layers consist of coarse polyproylene fibres of around 20 microns diameter which are employed to protect the integrity of the micro-fine fibres. The three layers are point-bonded by either thermal or ultrasonic techniques or any other suitable technique and these areas may appear as square or round dots, or any other shapes arranged in a convenient or artistic pattern on the surface of the material. One grade of EHP laminate which has been tested and proved to be effective has a total thickness of 0.5 mm a total fabric weight of 60 g/m$^2$ and the three layers being approximately the same thickness. Each layer has about equal fabric weight of 20 g/m$^2$.

Such laminates can be used to manufacture the barrier tube.

The flow openings 5 are within the range of 0.1 mm to 3 mm in diameter with a combined total area of between 0.1 mm$^2$ and 10 mm$^2$.

It has been found that in certain circumstances, for example below certain lengths of tube, it is advantageous to have flow openings 5 as this prevents the micro-fine fibres in the tube becoming clogged, the flow openings allowing what is in effect a controlled leakage, thus, the micro-fine fibres inevitably become blocked without the opening and the pressure drop across the barrier tube is unacceptable. It has been found that due to the particular range of packing density and thickness of these micro-fine fibres and, below the certain length of tube provided if there is a flow opening the tube increases in filtration efficiency as the smoking proceeds without the usual high increase in the pressure drop. As the filtration efficiency of the last few puffs is markedly higher than during the earlier puffs, less "tar" is being delivered to the smoker's mouth at that stage and the smoker therefore experiences a much more even taste.

In this particular filter configuration, a cigarette filter designer is given a wide choice of variation to suit any particular filtration requirement. For example, the filtration area of barrier tube 1 can be increased by increasing its diameter and/or axial length.

When an excessive filtration area is provided by the barrier tube 1, the dust holding capacity will correspondingly increase to an excessive level. The collected smoke particulates will therefore no longer be sufficient to cause any significant reduction of the voidage inside the micro-fine fibres, and therefore the require characteristic of increasing filtration efficiency as the filtration process proceeds will not occur. Furthermore, the filtration efficiency may be too great to maintain an adequaete level of taste to the smoker. When a sufficient but not excessive filtration area is provided it is found that the provision of aperture 5 may not be necessary but the filter still has the particular characteristic of increasing its filtration efficiency as the filtration of the smoke process proceeds.

Figure 2:
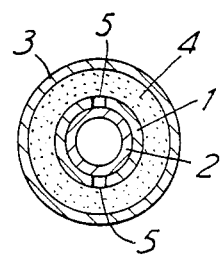
FIG. 2 is a cross-sectional end view on line A—A of FIG. 1.

The filter configuration shown in FIGS. 1 and 2 may be varied in many practical ways with similar effect of increasing filter efficiency as the filtration process proceeds, and FIGS. 3–11 show some variations.

Figure 3:
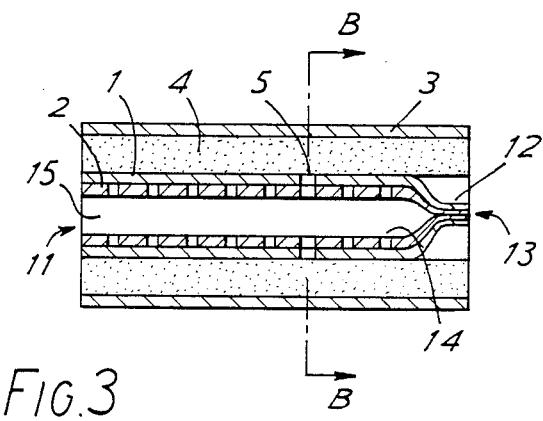
FIG. 3 is a cross-sectional view of another embodiment of a filter rod element according to the present invention.
Figure 4:
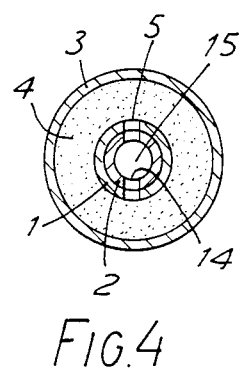
FIG. 4 is a cross-sectional view on line B—B of FIG. 3.

FIGS. 3 and 4 show a cigarette filter rod element which provides a whole filter rod and which comprises a plug wrap 3, conventional filter material 4 such as cellulose acetate tow or polypropylene tow, and a rigid support tube 2 placed centrally and axially along the filter rod. Tube 2 may be made of thermal plastics material and it is wrapped with a layer of fibres on its entire outer tube wall to form a barrier tube 1. Barrier tube 1 is made of micro-fine fibres or a laminate containing such fibres. One end of the wrapped tube 2 is open at end 11. The other end of wrapped tube 2 is crimped, together with barrier tube 1, to form a blocked end 12 at the end 13 of the element. This blocked end 12 functions in a similar manner to the blocking means indicated by numeral 6 in FIG. 1. The wall of the support tube 2 may be porous, but if it is impervious, it is perforated with apertures 14. Apertures 5 may not be necessary if the total filtration area of barrier tube 1 is found to be sufficient. The smoke from a cigarette can enter the filter rod from either end. When the smoke enters end 13, a fraction of the smoke stream flows through material 4 and out at end 11. Another fraction of smoke flows into the tube cavity 15 through the barrier tube 1, through the aperture 14 and flows out at end 11. As explained previously, the filtration efficiency of the barrier tube 1 will increase as the filtration process proceeds, and this characteristic contributes to the graduate increase of filtration efficiency of the whole filter rod.

Figure 5:
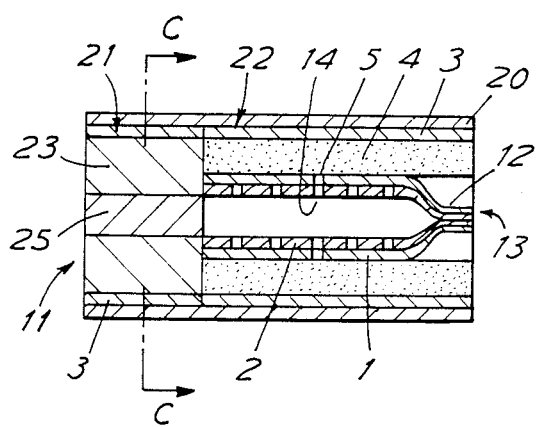
FIG. 5 is a cross-sectional view of an alternative construction of a filter rod incorporating a filter rod element according to the present invention.
Figure 6:
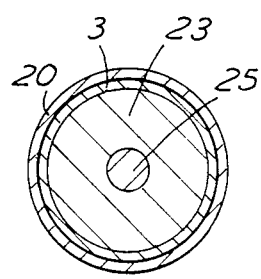
FIG. 6 is a cross-sectional view on line C—C of FIG. 5.

FIGS. 5 and 6 show another variation of the filter configuration shown in FIGS. 1 and 2. This construction provides a dual filter rod which includes a plug wrap 20 which holds two rod segments 21 and 22 in abuttment with each other. Rod segment 22 is similar to that shown in FIGS. 3 and 4 and rod segment 21 consists of plug wrap 3, filter material 23 and a core 25 situated centrally and axially.

The material 23 may be of an impervious material or may consist of commonly used materials such as the cellulose acetate or polypropylene tow which is densely parked together but it should be impervious, or its flow resistance for gas flowing through it should be made as high as possible. When the commonly known filter materials succh as the cellulose acetate or polypropylene tows are used, it should be packed at high packing density. The core 25 may be an empty channel, or be filled with material which is loosely packed so that it provides a passage for gas flow with minimum flow resistance. The diameter of the core 25 is to be either the same, or preferably smaller than the diameter of support tube 2. The core 25 is preferably aligned axially with the tube 2. As the material 23 acts as a blocking means it will function as the blocking means 7 indicated in FIG. 1. The smoke flow through the filter is similar to that described with regard to FIGS. 1, 2, 3 and 4.

Figure 7:
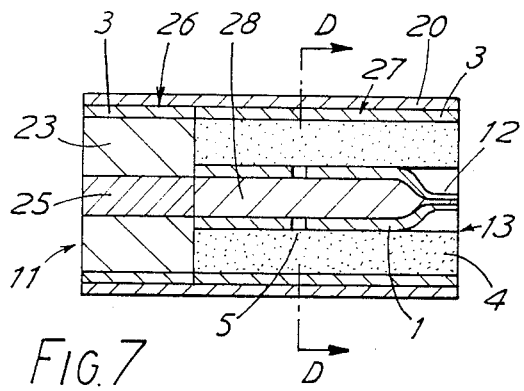
FIG. 7 is a cross-sectional view of another embodiment of a filter rod incorporating an element according to the present invention.
Figure 8:
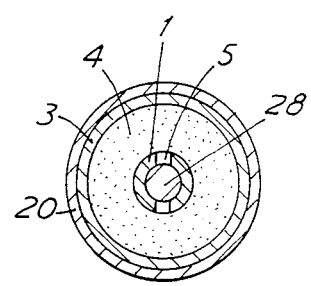
FIG. 8 is a cross-sectional view on line D—D of FIG. 7.

FIGS. 7 and 8 show another practical way of making a filter rod according to the filter rod configuration shown in FIGS. 1 and 2. This construction again provides a dual filter rod which includes an outer plugwrap 20 and rod segments 26 and 27. Rod segment 26 is similar to the rod segment 21 shown in FIGS. 5 and 6 and rod segment 27 is similar to rod segment 22 shown in FIGS. 5 and 6 except that the tube 2 is omitted. The barrier tube 1 is now wrapped around a core rod 28 made of any suitable porous material, preferably with minimum flow resistance to gas flow. Commonly known filter materials such as the cellulose acetate or polypropylene tow may be used. Preferably, the tow used will be the one consisting of a coarse fibre such as 5 denier per filament or larger. In addition, the filter material should be packed with a low packing density. One or more apertures 5 situated at any convenient location on the uncrimped portion of barrier tube 1 can be provided. Smoke flow through this dual filter rod is similar to that described with regard to the other embodiments.

Figure 9:
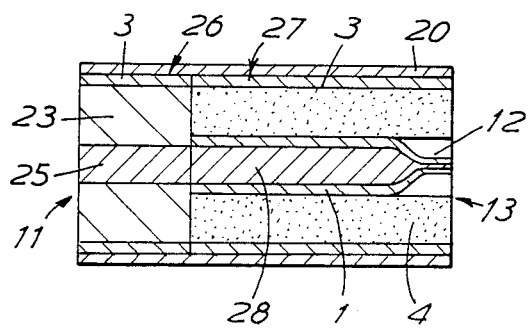
FIG. 9 is a cross-sectional view of another alternative construction of a filter rod.

FIG. 9 shows another embodiment. This filter rod is similar to that shown in FIGS. 7 and 8 and the same reference numerals are used to indicated similar parts, except that there are no apertures in the barrier tube. As explained previously, the provision of the aperture 5 in barrier tube 1 may not be necessary if a sufficient but not excessive filtration area from the uncrimped portion of the barrier tube 1 has been provided.

Figure 10:
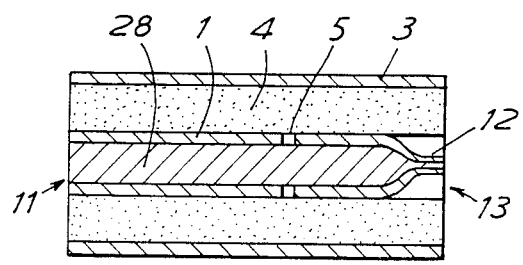
FIG. 10 is a cross-sectional view of yet another embodiment of a filter rod element according to the present invention; and, FIG. 11 is a cross-sectional veiw of yet another embodiment of a filter rod element according to the present invention.

FIG. 10 shows yet another embodiment in which filter rod is similar to that shown in FIGS. 3 and 4 except that the support tube 2 is omitted. The barrier tube 1 is wrapped around a core rod 28 which is made of porous material similar to that shown in FIGS. 7 and 8. One or more apertures 5 are provided at any convenient location along the uncrimped portion of the barrier tube 1.

Figure 11:
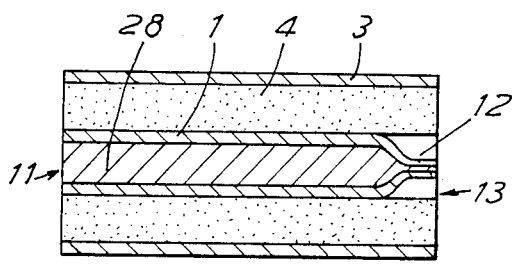

In FIG. 11 the filter rod element is the same as that shown in FIG. 10 except that there is no aperture 5 on the barrier tube 1. As explained above, the provision of the aperture 5 in barrier tube 1 may not be necessary if a sufficient but not excessive filtration area from the uncrimped portion of the barrier tube 1 has been provided.

Tip ventilation holes (not shown) may be provided to form either a tip-ventilated filter rod, or a tip-ventilated filter-tipped cigarette.

We claim:

1. A cigarette filter rod element comprising an outer wall having an inner surface which surrounds and is spaced from an axially extending porous barrier tube to thereby provide a space therebetween, said barrier tube being a wall made of micro-fine fibres with a diameter of between 0.5 and 10 microns, and said barrier tube being located so that at least part of the gas flow passes through said space and through said barrier tube wall.

2. A cigarette filter rod element as claimed in claim 1 in which said barrier tube wall is made of micro-fine fibres having a packing density of 0.05 to 0.3 and a wall thickness between 0.05 and 2 mm.

3. A cigarette filter rod element as claimed in claim 2 in which said barrier tube is located axially within said outer wall, said space providing a flow path from end to end thereof, and said outer wall being provided by one of a plug wrap and a separate member 4. A cigarette filter rod element as claimed in claim 2 in which said barrier tube wall is provided with one or more flow openings each of which is in the range of 0.1 mm to 3.0 mm in diameter with a combined total area of between 0.1 mm$^2$ and 10 mm$^2$.

5. A cigarette filter rod element as claimed in claim 2 in which said barrier tube wall is shaped to provide inner and outer co-axial passages in said outer tube, one of which is closed at one end and the other of which is closed at another end so that the flow path passes through said barrier tube wall.

6. A cigarette filter rod element as claimed in claim 1 in which said barrier tube is located axially within said outer wall, said space providing a flow path from end to end thereof, and said outer wall being provided by one of a plug wrap and a separate member.

7. A cigarette filter rod element as claimed in claim 6 in which said barrier tube wall is provided with one or more flow openings each of which is in the range of 0.1 mm to 3.0 mm in diameter with a combined total area of between 0.1 mm$^2$ and 10 mm$^2$.

8. A cigarette filter rod element as claimed in claim 6 in which said barrier tube wall is shaped to provide inner and outer co-axial passages in said outer tube, one of which is closed at one end and the other of which is closed at another end so that the flow path passes through said barrier tube wall.

9. A cigarette filter rod element as claimed in claim 8 in which said barrier tube is carried on a porous support.

10. A cigarette filter rod element as claimed in claim 9 in which said space between the barrier tube and the outer wall contains a porous material.

11. A cigarette filter rod element as claimed in claim 9 in which said barrier tube wall is formed from a sheet of material comprising a layer of micro-fine fibres sandwiched between layers of porous material to form a laminate.

12. A cigarette filter rod element as claimed in claim 8 in which said space between the barrier tube and the outer wall contains a porous material.

13. A cigarette filter rod element as claimed in claim 12 in which said barrier tube wall is formed from a sheet of material comprising a layer of micro-fine fibres sandwiched between layers of porous material to form a laminate.

14. A cigarette filter rod element as claimed in claim 12 in which the fibrous material is cellulose acetate or polypropylene tow material.

15. A cigarette filter rod element as claimed in claim 14 in which said barrier tube wall is formed from a sheet of material comprising a layer of micro-fine fibres sandwiched between layers of porous material to form a laminate.

16. A cigarette filter rod element as claimed in claim 8 in which said barrier tube wall is formed from a sheet of material comprising a layer of micro-fine fibres sandwiched between layers of porous material to form a laminate.

17. A cigarette filter rod element as claimed in claim 6 in which said barrier tube wall is shaped to provide inner and outer co-axial passages in said outer tube, one of which is closed at one end and the other of which is closed at another end so that the flow path passes through said barrier tube wall.

* * * * *

UNITED STATES PATENT AND TRADEMARK OFFICE
CERTIFICATE OF CORRECTION

PATENT NO.  : 4,972,853

DATED       : November 27, 1990

INVENTOR(S) : Warren A. Brackmann and Tow P. Liew

It is certified that error appears in the above-identified patent and that said Letters Patent is hereby corrected as shown below:

ON THE TITLE PAGE

In the "heading" under the caption "Assignee":

"SK Hand Tool Corporation,
 Defiance, Ohio"

should read:

-- Rothmans International Tobacco (UK) Limited
   Aylesbury, England --.

Signed and Sealed this

Twenty-eighth Day of July, 1992

*Attest:*

DOUGLAS B. COMER

*Attesting Officer*     Acting Commissioner of Patents and Trademarks